Figure 1:
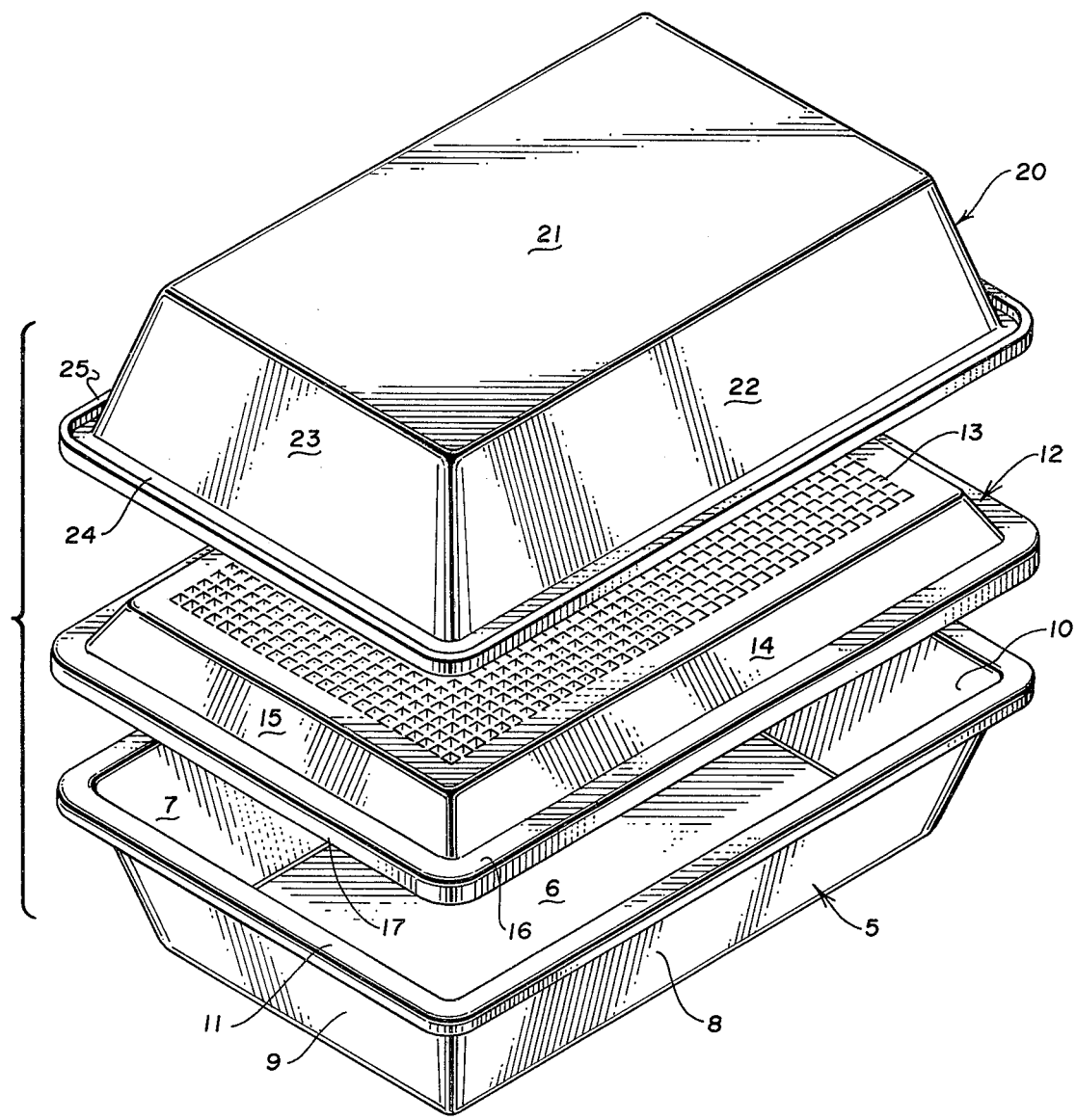

United States Patent [19]

Larter

[11] 4,325,325
[45] Apr. 20, 1982

[54] SELF-CLEANING LITTER BOX

[76] Inventor: Waynne D. Larter, Box 405, Cruz Bay, St. John, V.I. 00830

[21] Appl. No.: 202,598

[22] Filed: Oct. 31, 1980

[51] Int. Cl.³ ............................................ A01K 29/00
[52] U.S. Cl. ...................................................... 119/1
[58] Field of Search ...................... 119/1, 19; 209/251, 209/370–374; 220/4 B, 4 E

[56] References Cited

U.S. PATENT DOCUMENTS

| | | | |
|---|---|---|---|
| 3,223,588 | 2/1966 | Thoman | 119/1 |
| 3,360,153 | 12/1967 | Wheaton, Jr. | 220/4 B |
| 4,217,857 | 8/1980 | Geddie | 119/1 |

*Primary Examiner*—Jay N. Eskovitz

*Attorney, Agent, or Firm*—Schroeder, Siegfried, Vidas, Steffey & Arrett

[57] ABSTRACT

A self-cleaning animal litter box comprised of an open imperforate container, a superimposed separator on said container and having upstanding wall structure surrounding a centrally disposed screen and abutting the walls of that container in sealing relation, and a second but inverted container having depending wall structure which corresponds in shape but is slightly larger in transverse dimensions than that of the separator and which is superimposed with respect to the separator and first container in sealing relation to form a unit whereby inversion of the unit causes the screen to automatically separate the litter from the animal excrement which may have been deposited thereon.

10 Claims, 2 Drawing Figures

U.S. Patent  Apr. 20, 1982  4,325,325

SELF-CLEANING LITTER BOX

FIELD AND BACKGROUND OF INVENTION

This invention relates to animal litter boxes. More particularly, it relates to an animal litter box constructed and designed to automatically separate the litter from animal increment in a tidy, simple, inexpensive and time-saving manner.

It is a general object of my invention to provide a novel, simple and inexpensive litter box which will automatically, upon inversion, separate the litter from the animal increment.

A more specific object is to provide a litter box so constructed and designed that the litter therein may be cleaned in a simple, tidy, and time-saving manner with a minimum of effort.

Another object is to provide an improved animal litter box which obviates much of the messiness and disagreeable aspects of cleaning such a litter box and effects a substantial saving in time and effort.

Figure 2:
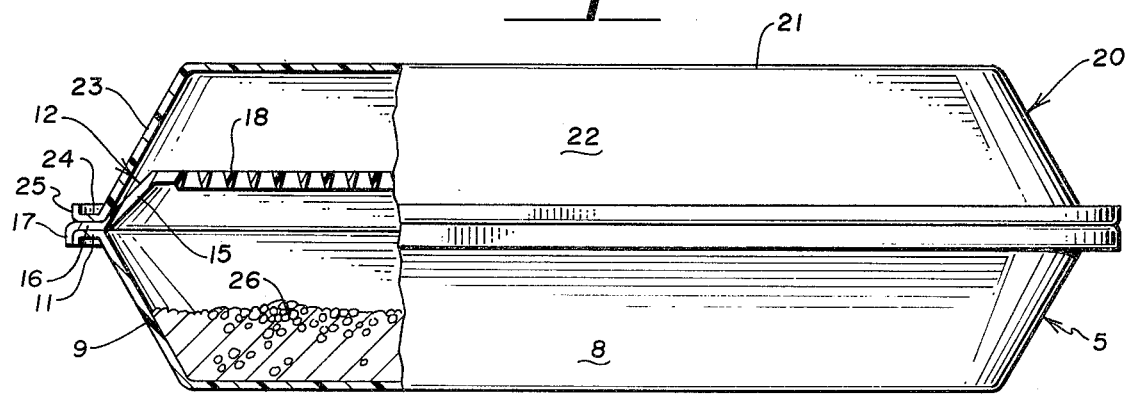

These and other objects and advantages or my invention will more fully appear from the following description, made in connection with the accompanying drawings, wherein like reference characters refer to the same or similar parts throughout the several views, in which:

FIG. 1 is a perspective view of the three parts of my self-cleaning litter box arranged in spaced relative positions preparatory to assembly for litter separating use; and, FIG. 2 is a side elevational view of the same in assembled litter-separating position with portions of the device shown in vertical section.

The preferred embodiment of my invention is shown in FIGS. 1-2, inclusive, in which a container indicated generally by the numeral 5, having an imperforate bottom 6, upstanding and outwardly extending side walls 7 and 8 and upstanding and outwardly extending end walls 9 and 10, is provided. The imperforate bottom 6 and the walls 7-10, inclusive, cooperatively define an imperforate receptacle which is adapted to receive and contain litter and animal excrement therewithin. A horizontally extending abutment shoulder 11 is carried by the upper edge portions of the side and end walls 7-10, inclusive, and extends entirely therearound, as best shown in FIG. 1.

A separator indicated generally by the numeral 12 is also provided to facilitate the separation of the clean litter from any animal excrement that may be deposited thereupon. The separator 12 is adapted to be disposed in superimposed relation to the container 5 and is provided with a rectangularly shaped foraminous central portion 13 which has dimensions corresponding and substantially equal to the dimensions of the bottom 6 of the container 5. The separator 12 has imperforate side and end walls 14 and 15 respectively which extend downwardly and outwardly from the foraminous central portion 13. At the lower end of the pair of side walls 14 and pair of end walls 15, there is a horizontally extending abutment shoulder 16 which is carried by the lower peripheral areas of the side and end walls and extends continuously therearound and outwardly therefrom as best shown in FIG. 2. The side and end walls and shoulder of the separator are constructed and arranged so as to cause the abutment shoulder 16 to abut against the container shoulder 11 in flush superimposed sealing relationship along their respective lengths. A flange member 17 is carried by the abutment shoulder 16 and extends downwardly therefrom as best shown in FIG. 1. This flange member 17 extends entirely around the periphery of the abutment shoulder 16 and the latter extends entirely around the periphery of the separator 12. Flange 17, of course, causes the separator 12 to be maintained in snug tight fitting superimposed relation to the bottom container 5 when it is positioned as shown in FIG. 2. The size of the openings 18 in the foraminous central portion 13 is approximately 8/32 of one inch and in any event, is slightly larger than the granules of commercial kitty litter.

The third element of my self-cleaning litter box, is a second container identified generally by the numeral 20. This container is inverted and has an imperforate bottom 21, a pair of opposed side walls such as is indicated by the numeral 22 and a pair of opposed end walls which is indicated by the numeral 23. These end walls and side walls extend downwardly in diverging relation from the peripheral portions of the imperforated bottom 21 and terminate in an outwardly extending shoulder element 24 which extends horizontally and fits in superimposed relationship to the shoulder 16 of the separator 12 when the unit is assembled as shown in FIG. 2. The shoulder 24, of course, extends entirely around the periphery of the side and end walls of the inverted container 20 and supports an upstanding, annular flange 25, as best shown in FIG. 2. When in use the lower container 5 is provided with clean kitty litter 26 in order to maintain the container 5 in relatively clean condition, even though an animal may deposit excrement thereupon. Under such conditions, the separator 12 is applied in superimposed condition to the container 5 as shown in FIG. 2, and the inverted container 21 is thereafter superimposed relative to the separator 12, again as shown in FIG. 2. Thereupon, by inverting the entire unit when so assembled, the litter 26 will rapidly sift downwardly through the screen which constitutes the foraminous central portion 13 of the separator and the animal excrement will be retained thereupon. Thereafter the container 5, which is now in elevated position, relative to the container 21, is removed separately. Thereafter, the separator 12 with the animal excrement supported thereby is also removed and may be discarded in a clean and sanitary manner.

From the above it can be readily seen that I have provided a self-cleaning animal litter box which automatically separates the litter from the animal excrement which may have been deposited therein. It will be appreciated that through the use of this device, the litter may be separated from the animal excrement in a tidy, simple, inexpensive and time-saving manner with a minimum of effort and a substantially saving of time. Moreover, much of the messiness and disagreeable aspects of cleaning such a litter box is thereby obviated.

It will, of course, be understood that various changes may be made in the form, details, arrangement and proportions of the parts without departing from the scope of the invention which consists of the matter shown and described herein and set forth in the appended claims.

What I claim is:
1. A self-cleaning animal litter box comprising:
   (a) a container having an imperforate bottom and imperforate wall structure extending upwardly from said bottom and having free upper edge portions and cooperatively forming with said bottom an imperforate receptacle adapted to receive and contain litter and animal excrement therewithin;

(b) a horizontal extending abutment shoulder carried by said upper edge portions of said wall structure and extending therealong;

(c) a separator constructed and arranged to be disposed in superimposed relation to said container and having a foraminous central portion spaced a substantial distance above said container and imperforate wall structure surrounding said central portion extending downwardly and outwardly therefrom and having lower peripheral portions;

(d) an abutment shoulder carried by said lower peripheral portions of said separator wall structure;

(e) said wall structure and said shoulder of said separator having such dimensions and being so constructed and arranged as to cause said separator shoulder to abut said container shoulder in flush sealing relation throughout their respective lengths when said separator is superimposed upon said container;

(f) means associated with said separator for holding said shoulders against lateral shifting movement relative to each other; and (g) an inverted second container constructed and arranged to be superimposed upon said first mentioned container in non-telescoping relation and having an imperforate bottom and imperforate wall structure extending downwardly from said bottom and cooperatively forming therewith a second imperforate receptacle having lower edge portions;

(h) said second container having a horizontally extending abutment shoulder carried by said lower edge portions of its said wall structure and extending outwardly therealong, and being constructed and arranged to rest in abutting superimposed sealing relation along its length upon the upper surface of said separator shoulder, whereby any litter within said first container, upon inversion thereof as a unit with said separator and said second container so superimposed, will pass through said separator into said second container and will thereby be separated from any animal excrement which may have been deposited upon such litter within said first container, while said separator was not so disposed;

(i) the openings in said foraminous central portion of said separator being slightly larger than the granules of commercial kitty litter.

2. A self-cleaning animal litter box comprising:

(a) a container having an imperforate bottom and imperforate upstanding side and end walls extending upwardly from said bottom and cooperatively defining therewith an imperforate receptacle adapted to receive and contain litter and animal increment therewithin;

(b) a horizontally extending aubtment shoulder carried by the upper edge portions of said side and end walls and extending therearound;

(c) a separator disposed in superimposed relation to said container and having a foraminous central portion and having imperforate side and end walls connected to the peripheral areas of said central portion and extending continuously therearound and downwardly and outwardly therefrom;

(d) a horizontally extending abutment shoulder carried by the lower peripheral portions of said separator side and end walls and extending laterally outwardly therefrom;

(e) said side and end walls and shoulder of said separator having such dimensions and being constructed and arranged to cause said abutment shoulder to abut said container shoulder in flush superimposed sealing relation along their respective lengths;

(f) means associated with said separator for holding said shoulders against transverse shifting movement' relative to each other; and (g) an inverted second container constructed and arranged to be superimposed upon said first mentioned container in non-telescoping relation and having an imperforate bottom and imperforate side and end walls extending downwardly from said bottom;

(h) said second container having a horizontally extending abutment shoulder carried by the lower edge portions of its said side and end walls and extending outwardly therearound and constructed and arranged to rest in abutting superimposed and sealing relation along its length upon the upper surface of said separator shoulder whereby any litter within said first container, upon inversion as a unit of said first container, separator, and second container, will pass through said separator into said second container and will be thereby separated from any animal excrement which may have been deposited upon such litter within said first container while said separator was not so disposed;

(i) the openings in said foraminous central portion of said separator being only slightly larger than the granules of commercial kitty litter.

3. The structure defined in claim 2, wherein the size of the openings in said foraminous central portion of said separator approximates 8/32 of an inch in their transverse dimensions.

4. The structure defined in claim 2 wherein said shoulders extend continuously along their said supporting peripheral and edge portions.

5. The structure defined in claim 2, wherein said means associated with said separator for holding said shoulders against transverse lateral shifting movement relative to each other is comprised of flange structure carried by said separator shoulder and depending therefrom immediately outside of said abutment shoulder of said first-mentioned container.

6. The structure defined in claim 2, wherein the horizontal dimensions and shape of said foraminous central portion of said separator approximate the horizontal dimensions and shape of said bottom of said first-mentioned container and said foraminous central portion is spaced vertically from said first mentioned container and is disposed well thereabove.

7. The structure defined in claim 2, wherein the size of the openings in said foraminous central portion of said separator approximates 8/32 of an inch in transverse dimensions and the horizontal dimensions and shape of said foraminous central portion of said separator approximate the horizontal dimensions and shape of said bottom of said first-mentioned container.

8. The structure defined in claim 2, wherein said foraminous central portion of said separator is comprised of wire screening the opening of which approximate 8/32 of an inch.

9. The structure defined in claim 2, wherein the exterior transverse dimensions and shape of said wall structure of said separator approximates the interior transverse dimensions and shape of said wall structure of said second-mentioned container and said wall structure of said separator fits snugly within said wall structure of said second-mentioned container.

10. The structure defined in claim 2, wherein (j) the horizontal dimensions and shape of said foraminous central portion of said separator approximates the horizontal dimensions and shape of said bottom of said first-mentioned container, said central portion being comprised of screening the size of the openings of which approximates 8/32 of an inch, and;

(k) the exterior transverse dimensions and shape of said wall structure of said separator approximate the interior transverse dimensions and shape of said wall structure of said second-mentioned container and said wall structure of said separator extends upwardly a substantial distance into and fits snugly within said wall structure of said secondmentioned container.

* * * * *